United States Patent

Topolski et al.

[11] Patent Number: 6,004,660
[45] Date of Patent: Dec. 21, 1999

[54] OXYGEN BARRIER COMPOSITE FILM STRUCTURE

[75] Inventors: Alvin Stanley Topolski, Wilmington, Del.; Clifford Cheng-Shiou Chang, Midlothian, Va.; George Merton Gordon Cumberbatch, Wilmington, Del.; David Henry Britt, Woodstock, Ga.

[73] Assignee: E.I. du Pont de Nemours and Company, Wilmington, Del.

[21] Appl. No.: 09/041,321

[22] Filed: Mar. 12, 1998

[51] Int. Cl.⁶ ........................................ B32B 7/02
[52] U.S. Cl. ........................ 428/212; 428/195; 428/220; 428/457; 428/688
[58] Field of Search .................. 428/212, 195, 428/220, 457, 688

[56] References Cited

U.S. PATENT DOCUMENTS

| | | | |
|---|---|---|---|
| 3,993,811 | 11/1976 | Walles | 428/35 |
| 4,594,279 | 6/1986 | Yoneno et al. | 428/69 |
| 4,662,521 | 5/1987 | Moretti | 206/484.2 |
| 4,937,113 | 6/1990 | Engelsberger | 428/35.3 |
| 4,983,432 | 1/1991 | Bissot | 428/35.7 |
| 5,018,328 | 5/1991 | Cur et al. | 50/406 |
| 5,021,298 | 6/1991 | Revell | 428/458 |
| 5,026,135 | 6/1991 | Booth | 350/96.12 |
| 5,064,716 | 11/1991 | Chou et al. | 428/336 |
| 5,091,233 | 2/1992 | Kirby et al. | 428/69 |
| 5,759,653 | 6/1998 | Collette et al. | 428/35.9 |

Primary Examiner—William Krynski
Assistant Examiner—B. Shewareged

[57] ABSTRACT

A composite film structure containing two inorganic layers each being not greater than 600 angstroms in thickness and having an oxygen transmission rate (OTR) not greater than 0.8 cubic centimeters/square meter-day-atmosphere with one of the layers in contact or in substantial contact with a polymeric barrier layer having an oxygen permeability coefficient (OPV) not greater than 1.5 cubic centimeters-25 microns/square meter-day-atm. The composite film structure has an oxygen transmission rate (OTR) of not greater than 0.012 cubic centimeters/square meter-day-atm and can be used in vacuum panel insulation structures.

17 Claims, 4 Drawing Sheets

---

92 GAUGE BIAXIALLY ORIENTED POLYESTER FILM

VACUUM METALLIZED ALUMINUM 1.8 g/m² VINYLIDENE CHLORIDE COPOLYMER SOLVENT COATING

VACUUM METALLIZED ALUMINUM

.8 g/m² POLYVINYL ALCOHOL

PEI PRIMER AQUEOUS COATING

48 GAUGE BIAXIALLY ORIENTED POLYESTER FILM 10 g/m AMORPHOUS COPOLYESTER SOLVENT COATING

EXAMPLE 1

| |
|---|
| 92 GAUGE BIAXIALLY ORIENTED POLYESTER FILM |
| VACUUM METALLIZED ALUMINUM |
| 1.8 g/m$^2$ VINYLIDENE CHLORIDE COPOLYMER SOLVENT COATING |
| VACUUM METALLIZED ALUMINUM |
| .8 g/m$^2$ POLYVINYL ALCOHOL |
| PEI PRIMER AQUEOUS COATING |
| 48 GAUGE BIAXIALLY ORIENTED POLYESTER FILM |
| 10 g/m AMORPHOUS COPOLYESTER SOLVENT COATING |

FIG. 1

EXAMPLE 2

| |
|---|
| 1.8 g/m² VINYLIDENE CHLORIDE COPOLYMER SOLVENT COATING |
| 92 GAUGE MYLAR BIAX ORIENTED POLYESTER FILM |
| VACUUM METALLIZED ALUMINUM |
| LAMINATING ADHESIVE LAYER |
| VACUUM METALLIZED ALUMINUM |
| .8 g/m² POLYVINYL ALCOHOL |
| PEI PRIMER AQUEOUS COATING |
| 48 GAUGE BIAXIALLY ORIENTED POLYESTER FILM |
| 10 g/m AMORPHOUS COPOLYESTER SOLVENT COATING |

FIG. 2

EXAMPLE 3

| |
|---|
| 48 GAUGE BIAXIALLY ORIENTED POLYESTER FILM |
| PEI PRIMER AQUEOUS COATING |
| .8 g/m$^2$ POLYVINYL ALCOHOL |
| VACUUM METALLIZED ALUMINUM |
| LAMINATING ADHESIVE LAYER |
| VACUUM METALLIZED ALUMINUM |
| .8 g/m$^2$ POLYVINYL ALCOHOL |
| PEI PRIMER AQUEOUS COATING |
| 48 GAUGE BIAXIALLY ORIENTED POLYESTER FILM |

FIG. 3

OXYGEN BARRIER COMPOSITE FILM STRUCTURE

BACKGROUND OF THE INVENTION

The present invention is directed to a composite film structure having superior barrier properties to atmospheric gases as measured by low oxygen transmission together with low thermal transfer to the edges of the film structure. The composite is particularly suitable for commercial fabrication of vacuum insulation panels for refrigerators, ovens and shipping containers.

In the construction of vacuum insulating panels it is well known that a high vacuum significantly improves the insulating properties and the use of a metal foil provides a superior barrier to transmission of atmospheric gases. The use of a metal foil in an insulating composite film, however, inherently provides a tradeoff in properties such as higher weight, thicker film, and undesirable heat conduction along the surface of the film. Therefore, composite film constructions are desired which replace the metal foil in a film composite and yet maintain acceptable levels of impermeability to atmospheric gases. In addition, replacement of a metal foil in a composite film structure with a more flexible element resistant to cracking advantageously facilitates reliable automated production and may provide an equal or even improved impermeability to atmospheric gases.

The present invention is an improvement over Revell GB 2210899, assigned to Bowater Packaging Limited, which discloses metallized plastic film composites having low permeability to gases, moisture and light comprising a thermoplastic film metallized on at least one surface, overcoated on the metal surface with a substantially continuous thin plastic coating less than 10 microns in thickness and remetallized on the coated surface. The preferred metal is vacuum deposited aluminum and plastic coatings include thermoplastic lacquers or inks based on resins such as polyester, nitrocellulose, acrylic, vinyl or polyvinylidene chloride with solvent-based polyester lacquers being preferred. However, the teachings of Revell do not provide a composite film having barrier properties comparable to the composite films of the present invention.

Revell in U.S. Pat. No. 5,021,298, also assigned to Bowater Packaging Limited, further discloses barrier improvements using single vacuum metallized layers applied over smooth thin polymeric layers without the need for any second metallized layer.

The teaching of both of the Revell patents is clearly directed to the improved barrier properties obtained using vacuum metallized layers deposited on smooth surfaced polymeric substrates as alternatives to obtaining improved barrier properties using multiple vacuum deposited metal layers.

The following prior art is generally directed to insulating film composites providing barrier properties to air, particularly to oxygen.

Yoneno et al. U.S. Pat. No. 4,594,279, assigned to Matsushita Electric, discloses a vacuum-filled, pliable, heat insulating container containing flaky pearlite particles made from a single layer or a laminated film which can contain an aluminum deposited film or an aluminum foil. The patent discloses a thermal conductivity lower than 0.01 Kcal/mh° C.

Moretti U.S. Pat. No. 4,662,521, assigned to U.S. Phillips, discloses a thermal insulation bag composed of a multilayer laminate of polyethylene, aluminum foil and polyester.

Engelsberger U.S. Pat. No. 4,937,113, assigned to Helio Folio, discloses a multilayer film for vacuum packaging containing a support film which includes a plurality of layers including an aluminum film having a thickness of 7 microns.

Carr et al. U.S. Pat. No. 5,018,328, assigned to Whirlpool Corporation, discloses a vacuum insulation panel construction having a plurality of layers of gas impermeable material in conjunction with a metal foil for providing a thermal break. The foil is used on one side of the panel construction and the gas impermeable material is used on the other side to create the thermal break. However, this construction greatly reduces the life of the vacuum panel because the average barrier properties of the assembly include both the average barrier level of the foil and the reduced barrier level of the non-foil material.

Kirby U.S. Pat. No. 5,091,233, also assigned to Whirlpool Corporation, discloses vacuum insulation panels which contain a plurality of layers including a barrier film composed of a layer of metallized or nonmetallized plastic and a layer of metal foil. The patent points out the importance of thermal conduction along the surface of the panels. Inherently, a thermal break is formed as a spacing or gap in the metal foil used in the film composite. This thermal break prevents conduction of heat around the exterior of the vacuum panel from hot to cold side and compromises the total barrier level of the assembly.

Walles U.S. Pat. No. 3,993,811, assigned to Dow Chemical, discloses a thermal insulating panel having a double wall construction composed of a structural plastic material with improved thermal insulative properties due to reduced permeance of atmospheric gases into an evacuated center. The panel material is a thick structural plastic from 40 to 300 mils thick, which is fi metallized (0.0001 to 0.5 mil) and then overcoated with a barrier polymer by latex coating (0.001 to 2.5 mil). The preferred barrier polymer coating is polyvinylidene chloride copolymer. A surprising increase in barrier is reported by overcoating a metal with a barrier polymer as compared with a metallized structure plus a barrier polymer layer. The lowest oxygen transmission rate disclosed for the structure is 0.013 cc/square meter-day-atm.

Accordingly, there is still a need for a film composite which has superior properties to passage of oxygen together with the ability to act as an insulator.

SUMMARY OF INVENTION

The present invention is directed to a composite film structure containing a plurality of separate layers comprising:

(a) a first inorganic layer having a thickness not greater than 600 angstroms and having an oxygen transmission rate (OTR) not greater than 0.8 cubic centimeters/ square meter-day-atmosphere;

(b) a second inorganic layer having a thickness not greater than 600 angstroms and having an oxygen transmission rate (OTR) not greater than 0.8 cubic centimeters/ square meter-day-atmosphere; and (c) a polymeric barrier layer having an oxygen permeability coefficient (OPV) not greater than 1.5 cubic centimeters-25 microns/square meter-day-atmosphere wherein the polymeric barrier layer (c) is in contact or in substantial contact with at least one of the first (a) and second (b) inorganic layers, wherein the first (a) and second (b) inorganic layers are separated from one another by an intermediate adhesive layer and wherein the oxygen transmission rate (OTR) of the composite film structure is not greater than 0.012 cubic centimeters/square meter-dayatmosphere and the oxygen transmission rate (OTR) and oxygen permeability coefficient (OPV) are measured in accordance with ASTM D3985-81 at a temperature of 23° C., 50% relative humidity and using 100% oxygen on one side of the film at 760 mm Hg (1 atmosphere) and 100% nitrogen on the other side of the film at 760 mm Hg (1 atmosphere).

BRIEF DESCRIPTION OF THE FIGURES

FIG. 1 represents the layers forming the composite film structure of Example 1.

FIG. 2 represents the layers forming the composite film structure of Example 2.

FIG. 3 represents the layers forming the composite film structure of Example 3.

DETAILED DESCRIPTION OF THE INVENTION

Figure 4:
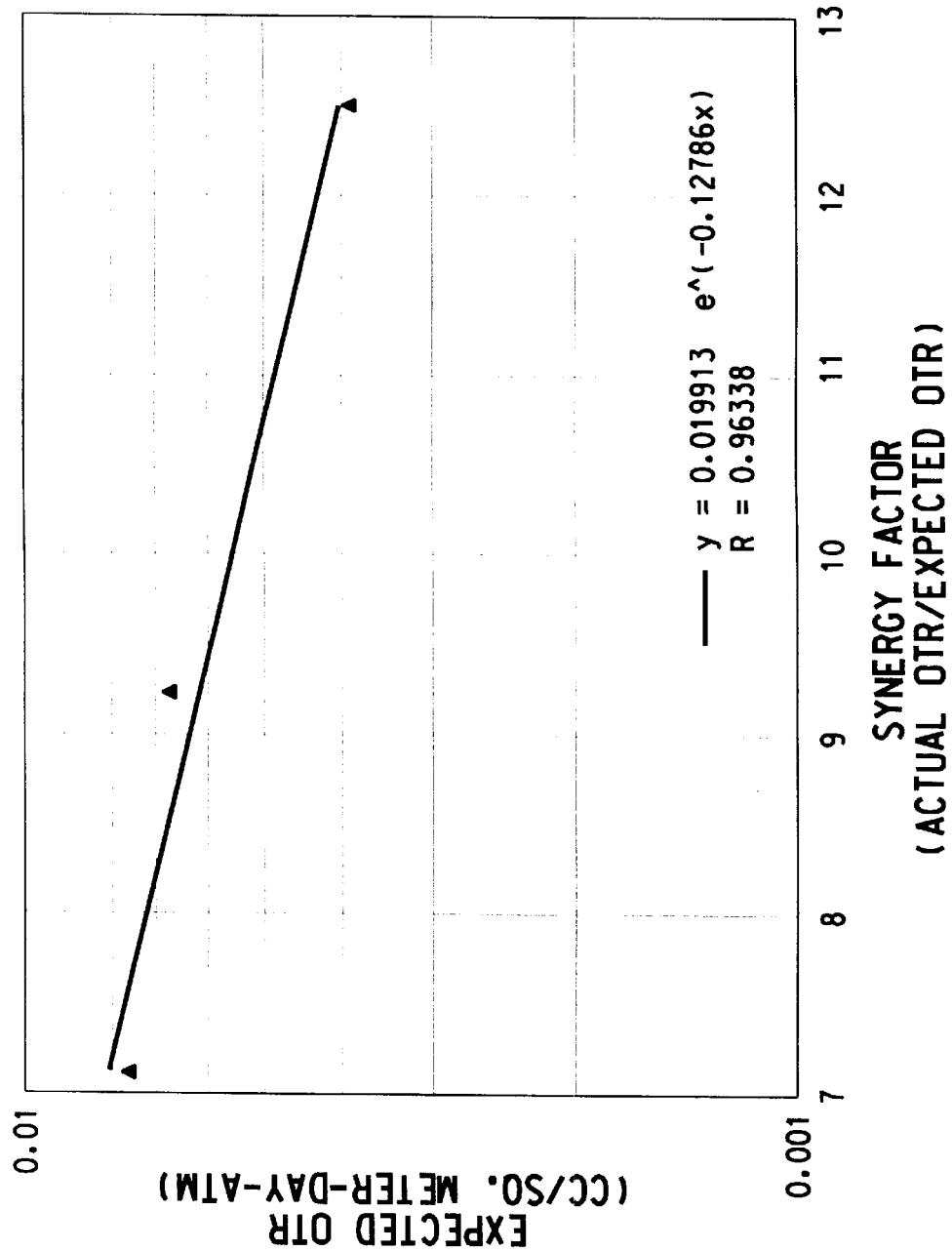
FIG. 4 is a graph of the expected oxygen transmission rate versus the actual oxygen transmission rate divided by the expected oxygen transmission rate.

The present invention relates a composite film structure comprising two specific inorganic layers and a specific polymer barrier layer wherein the composite film construction provides unexpected oxygen barrier properties compared to the additive barrier properties of the individual layers forming the overall final structure.

The oxygen barrier specifically as described herein is expressed as the oxygen transmission rate (referred to as OTR) as described in ASTM D3985-81 (reapproved in 1988) and is a measure of the quantity of oxygen gas passing through a unit area of parallel surfaces of a plastic film per unit time under the following test conditions:

temperature—23° C.

relative humidity—50%

100% oxygen on one film side at 760 mm Hg (1 atmosphere) and 100% nitrogen on the other film side at 760 mm Hg (1 atmosphere) and is expressed as cubic centimeters/square meter-day-atm. The test procedure is broadened in this disclosure to include inorganic materials including metals such as aluminum.

ASTM D3985-81 also provides a measure of the oxygen permeability coefficient (referred to as the oxygen permeability value or OPV) which is the product of the permeance of the thickness of the film and is expressed as cubic centimeters-25 microns/square meter-day-atmosphere.

In accordance with the present disclosure overall expected barrier of a composite film structure to oxygen was obtained using the following equation:

$$\frac{1}{\text{expected OTR of final composite}} = \frac{1}{\text{OTR of a first barrier layer of final composite}} = \frac{1}{\text{OTR of an } N^{th} \text{ barrier layer of the final composite}}$$

Crand, *The mathematics of Diffusion*, $2^{nd}$ Edition, p. 276, Oxford University Press, London 1975.

In the examples, in demonstrating unexpected results any barrier to oxygen by other than the two inorganic layers and the polymeric barrier was ignored since additional layers were considered to provide substantially no barrier to oxygen passage.

In addition, the oxygen barrier properties obtained by combining multiple layers was generally approximated by the following formula:

$$y = 0.019913 \, e^{\wedge}(-0.12786x)$$

wherein y is the barrier expected when two barrier layers are combined;

x is the ratio of the actual OTR/expected OTR; and $e^{\wedge}$ is 2.7183 raised to the power indicated in the parenthesis.

The graph in FIG. 4 was generated using the OTR data obtained from the examples in Table 3 by plotting the expected OTR on the ordinate versus the ratio of the actual OTR to the expected OTR on the abscissa. A mathematical relationship was approximated by a straight line on a semi-log axis indicating that the unexpected results are an exponential function of the expected barrier values. The mathematical relationship between the two variables is defined by the above formula. The graph in FIG. 4 confirms and quantifies the increased unexpected results obtained when high barrier layers are incorporated together in a structure and is expressed as a synergy factor.

The overall composite film structure of the present invention requires two inorganic layers having an oxygen transmission rate not greater than 0.8 cc/square meter-day-atmosphere (0.05 cc/100 square inches-day-atmosphere), preferably, not greater than 0.6 cc/square meter-day-atmosphere (0.038 ccl 00 square inches-day-atmosphere) and, most preferably, not greater than 0.4 cc/square meter-day-atmosphere (0.025 cc/i 100 square inches-day-atmosphere). A preferred class of inorganic materials are metals such as aluminum, nickel, copper, tin, or stainless steel. Other inorganic layer materials include silicon dioxide or aluminum oxide. Each of the inorganic layers has a thickness of not greater than 600 angstroms, preferably, not greater than 350 angstroms, and, most preferably, not greater than 230 angstroms. Due to the thinness of these inorganic layers, a supporting substrate is used in the process of composite film formation. The inorganic layers are preferably vacuum deposited on the support substrate. However, other techniques such as sputtering, plasma enhanced chemical vapor deposition or laser enhanced chemical vapor deposition can be used in the manufacture of individual metal layers provided the requisite thickness is not exceeded. Due to the required degree of thinness of the inorganic layers, conventional foils can not be used since they are too thick.

The support can be other than the polymeric barrier layers which are adjacent to the inorganic layers. For ease of construction and to introduce further desirable physical properties into the composite film, a separate support for the inorganic layer is generally employed. The support has adequate physical properties to protect the integrity of the barrier layer, including tensile strength, modulus, puncture resistance and flex crack resistance. Preferred support materials include biaxially oriented polyester due to its high tensile strength, high resistance to stretching and high flex-crack resistance. Other suitable support materials include polyethylene, nylon, polypropylene, polystyrene, cellophane, acetate, polyvinylidene chloride, ethylene vinyl alcohol, polyvinyl alcohol and amorphous nylon.

In the composite film structure of the invention the two inorganic layers are separated from one another by an intermediate laminating adhesive layer which serves to tightly bond the inorganic layers together. Suitable intermediate adhesive layers include solvent based polyesters, polyurethane and aliphatic isocyanate adhesive.

In the overall composite film structure of the present invention the polymer barrier layer must be in contact or in substantial contact with at least one of the inorganic layers. By "substantial contact" means that the spacing between at least one inorganic layer and the polymeric barrier layer is not greater than 0.00025 nmm (i.e., 0.00001 inches), which spacing allows for the inclusion of layers to assist fabrication of the composite or layers to improve the physical functionality of the structure (i.e., optics or mechanical properties).

The contact or substantial contact of the barrier polymer layer can occur only on one surface of an inorganic layer, since the barrier polymer layer does not have to lie intermediate the two inorganic layers. However, in one embodiment of the invention the barrier polymer can be located between and separates the two inorganic layers and can contact surfaces of both inorganic layers.

It is within the scope of the present invention that a surface modifier such as an adhesion promoter or a primer can be employed to increase the adhesion between at least one inorganic layer and the barrier layer.

The polymeric barrier layer that is in contact or in substantial contact with one of the inorganic layers has an oxygen permeation value (OPV) not greater than 1.5 cubic centimeters-25 microns/square meter-day-atmosphere, preferably, 0.50 cubic centimeters-25 microns/square meter-day-atm and, more preferably, 0.16 cubic centimeters-25 microns/square meter-day-atm. Suitable polymeric barrier layers include polyvinyl alcohol, ethylene vinyl alcohol, polyacrylonitrile and combinations thereof. Generally the polymeric barrier layer has adhesive properties to allow joining of the two inorganic or other polymeric layers. However, primers or adhesion promoters can also be used to join the inorganic and polymeric layers, provided that they do not compromise the barrier properties of the finished composite. The polymeric barrier layer, when positioned between the inorganic layers, can serve as both a barrier layer and an intermediate adhesive layer as previously described.

The thickness of the polymeric barrier layer must provide the requisite permeability coefficient of not greater than 1.5 cubic centimeters-25 microns/square meter-day-atmosphere. However, the polymeric barrier generally can have a thickness in a range of 0.01 to 75 microns and, more preferably, in a range of 0.40 to 0.80 micron. Also, in one aspect of the invention, the polymeric barrier layer must be flexible enough to allow the final composite film to be flexible. The rigidity or flexibility will be dependent on the final end use, e.g., a flexible or rigid insulation panel.

The polymeric barrier layer of the present invention differs from the polymeric barrier coating layer described by Revell in GB 2210899, which is metallized on one surface and overcoated with a thin plastic coating. The coating is not required to have any inherent barrier properties and includes water based, solvent-based or solventless thermoplastic lacquers or inks based on resins such as polyester, nitrocellulose, acrylic, vinyl or polyvinylidene chloride, hot melt coatings, extrusion coated thermoplastic resins and curing system resins. The polymeric barrier layer of the present invention differs from the disclosure of Revell since the choice of the barrier material is critical to the success of the invention. Unexpected results of the overall composite film, i.e., an oxygen transmission rate of not greater than 0.012 cubic centimeters/square meter-day-atmosphere are obtained, which lie outside the scope of the teachings of Revell.

The composite films of the present invention, in addition to having excellent barrier properties, have the capability of being formed around a panel structure by thermal welding of a top edge to a bottom edge surface, thereby creating a hermetically sealed structure capable of holding vacuum and providing good insulating capability. To facilitate welding, one side of the composite film, preferably, has a layer of a polymeric sealant material capable of being thermally heat sealed to itself with such integrity so as to maintain vacuum and integrity over time and use conditions of the panels. Suitable sealant materials include amorphous polyester, copolyesters, polyester blends, nylon, polyurethanes and polyolefins, including polyethylene, polypropylene, polyethylene vinylalcohol, ethylene vinylacetate copolymer, ionomer and acid copolymer.

To illustrate the invention, the following examples are provided. All parts and percentages are by weight unless otherwise indicated.

All OTR measurements were made according to ASTM D3985-81 at 23° C., 50% RH using a "MOCON SUPER-OXTRAN" with a sensitivity of +/–0.0002 cc/$m^2$-day-atm. The measurements were made using 100% oxygen on one side of the film at 760 mm Hg (1 atm) and 100% nitrogen on the other side of the film at 760 mm Hg (1 atm). The composite film sample size was 1040 square centimeters (i.e., 160 square inches).

NOMENCLATURE

"FILM A" was a Mylar® biaxially oriented polyester film, vacuum metallized with aluminum (2.8 optical density) on one side and solvent coated with polyvinylidene chloride copolymer on the urnetallizd side to a 1.6 g/$m^2$ coating weight.

"FILM C" was a Mylar® biaxially oriented polyester film, vacuum metallized with aluminum (2.8 optical density) on one side and solvent coated to a 1.8 g/$m^2$ coating weight with polyvinylidene chloride copolymer over the aluminum metallized layer.

"FILM D" was a Mylar® biaxially oriented polyester film, coated with polyvinyl alcohol to a 0.5 to 1.0 g/$m^2$ coating weight and vacuum metallized with aluminum (2.8 optical density) over the polyvinyl alcohol coating.

"FILM E" was "FILM D" with 10 g/$m^2$ of solvent coated amorphous copolyester on the unmetallized side of the film.

| POLYMERIC COATING COMPOSITION USED FOR "FILM A" AND "FILM C" | |
|---|---|
| Copolymer (>80%) | vinylidene chloride/vinyl chloride methylmethacrylate acrylonitrile |
| Fillers (<10%) | talc and waxes |
| Anti-blocking agent (<5%) | glycerol monostearate |
| Processing aids (<10%) | poly(terephthalic/isophthalic acid/ethylene glycol) |
| SEALANT COATING USED FOR "FILM E" | |
| Copolymers (Mixture of copolymers was 81.8% of total) | poly(terephthalic/azeleic acid/ethylene glycol) poly(terephthalic/sebacic acid/ethylene glycol) poly(terephthalic/isophthalic acid/ethylene glycol) |
| Anti-blocking agents | <20% erucamide, bisoleamide and oleamide |
| talc | <5% magnesium silicate |

In the various constructions for Examples 1 to 3 additional layers in addition to the necessary inorganic layers of metal and polymeric barrier layer were employed for ease of sample fabrication. Thermal or adhesive lamination techniques were used although other techniques and combinations can be employed.

EXAMPLE 1

"FILM C" was prepared by aluminum metallizing one side of a Mylar® LB polyester film using a thermal evaporation process. A roll of the film was placed in a vacuum chamber where it was unwound and exposed to evaporated aluminum which condensed on the cooler film surface. The polyvinylidene chloride copolymer coating was applied to the metallized side by solvent coating. The film was then thermally laminated to a second film, "FILM E", which was prepared as described below.

A polyvinyl alcohol coated polyester film was produced using a 2 layer sequential coating process wherein a polyethyleneimine primer was first applied from an aqueous solution using a reverse gravure coating technique. The polyethyleneimine solution was made at 1% solids by diluting with filtered water. The primer was dried providing a polyethyleneimine coating weight of 0.02 to 0.2 g/m². The primed polyester film was then topcoated with polyvinyl alcohol in a second coater station. Dry polyvinyl alcohol was diluted to a 10% solution using 95–98° C. water and steam sparging to make the coating bath. After cooling, the coating was applied using a reverse gravure coating technique. The coating speed was about 500 feet per minute (160 meters/minute). The polyvinyl alcohol coating was dried leaving a polyvinyl alcohol layer having a coating weight of 0.5 to 1.0 g/m². The product was then aluminum vacuum metallized as described above on the polyvinyl alcohol side to complete the fabrication of "FILM D". To make the product identified as "FILM E", "FILM D" was coated on the unmetallized side with a 17% solids copolyester solution in tetrahydrofuran. The coating was applied by reverse metering coating at about 700 feet per minute (225 meters/minute) and the coating was dried to leave a copolyester coating having a coating weight of 10 g/m².

"FILM E" was thermally laminated to "FILM C" metal side to metal side through the polyvinylidene chloride copolymer coating on "FILM C".

In Example 1, a polyvinyl alcohol coating having an OPV of <0.16 cc-25 microns/m²-day-atm is in contact with a metallized layer. A second metallized layer has a coating of polyvinylidene chloride copolymer. A copolyester coating is added to the bottom as a sealant layer to form an encapsulating pouch. Example 1 illustrates the unexpected low actual OTR measured as 0.00062 cc/m²-day-atm which is 10.7 times better than the expected calculated value of 0.00667 cc/m²-day-atm even when two film layers of dissimilar barrier properties are combined.

EXAMPLE 2

Example 2 is a two ply adhesive lamination of "FILM A" to "FILM E" with the metal side facing the metal side of each film and illustrates the use of an intermediate laminating adhesive layer.

Example 2 demonstrates that combinations of films having very different barrier properties also follow the unexpected ratio correlation. As in Example 1, a polyvinyl alcohol coating having an OPV of <0.16 cc-25 microns/m²-day-atm is in contact with a metallized layer. However, different from Example 1, the second metallized layer has no barrier coating and therefore acts as a layer with reduced barrier properties. A copolyester coating again was added to the bottom and acts as the sealant layer to form an encapsulating pouch. The actual OTR of this laminate is 0.00109 cc/m²-day-atm and is over 7 times the expected calculated value of 0.00760 cc/m²-day-atm.

EXAMPLE 3

Example 3 was made by adhesively laminating together two "FILM D" films, prepared as described in Example 1, with the metal side facing the metal side of each film using an intermediate laminating adhesive.

Example 3 demonstrates that superior barrier properties can be obtained by combining films of even higher barrier properties and gaining even a greater synergistic effect. Example 3 is an adhesive laminate of two identical films, each having a metal layer supported by a polyvinyl alcohol coated biaxially oriented polyester film. There is no sealant layer on this composite film. The composite film demonstrates the barrier properties of the laminate and was not used to fabricate a pouch for the vacuum insulated panel applications. The actual OTR of this laminate was 0.00031 cc/m²-day-atm and is over 12 times the expected calculated value of 0.00388 cc/m²-day-atm.

DISCUSSION OF UNEXPECTED RESULTS IN EXAMPLES

Table 1 lists the thickness and oxygen transmission rates (OTR) for various films and various laminations of films according to the invention.

TABLE 1

| SAMPLE DESCRIPTION | THICKNESS (microns) | ACTUAL OTR (CC/SQ. METER-DAY-ATM) |
|---|---|---|
| "FILM A" | 25 | 0.0775* |
| "FILM C" | 12 | 0.0465 |
| "FILM D" | 12 | 0.00775 |
| "FILM E" | 12 | 0.00775 |
| EXAMPLE 1 | 45 | 0.00062 |
| EXAMPLE 2 | 37 | 0.00109 |
| EXAMPLE 3 | 25 | 0.00031 |

OTR measurements were made using ASTM D3985-81 at 23° C., 50% RH using a "MOCON SUPEROXTRAN" with a sensitivity of +/− .0002 cc/m²-day-atm.
*OTR data taken from literature The unexpected performance of Examples 1 to 3 (Table 1) are illustrative of improvements over the expected barrier properties, i.e., OTR, calculated for each example by a standard industrial method according to the following equation:

TABLE 2

$$\frac{1}{\text{expected OTR}} = \frac{1}{\text{OTR of film S}} + \frac{1}{\text{OTR of film T}}$$

| Example No | Film S | Film S OTR (cc/ square meter · day · atm) | Film T | Film T OTR (cc/ square meter · day · atm) | Expected OTR (cc/ square meter · day · atm) |
|---|---|---|---|---|---|
| 1 | "FILM C" | 0.0465 | "FILM E" | 0.00775 | 0.00667 |
| 2 | "FILM A" | 0.775* | "FILM E" | 0.00775 | 0.00760 |
| 3 | "FILM D" | 0.00775 | "FILM D" | 0.00775 | 0.00388 |

*OTR data taken from literature

Table 3 summarizes the combined data of Tables 1 and 2 along with the calculated unexpected effect ratio of the expected OTR divided by the actual OTR of the composites from Examples 1, 2, and 3. These data are plotted in FIG. 4 and defined by the formula:

$$y = 0.19913 \, e^{\wedge}(-0.1279X)$$

wherein y is the barrier expected when two barrier layers are combined; and x is the ratio of the actual OTR/expected OTR.

The regression factor R=0.964 indicates a strong correlation of the unexpected ratios.

TABLE 3

| Example No. | OTR Film S (cc/m$^2$.day.atm) | OTR Film T (cc/m$^2$.day.atm) | Expected OTR (cc/m$^2$.day.atm) | Actual OTR (cc/m$^2$.day.atm) | Unexpected Result Ratio |
|---|---|---|---|---|---|
| 1 | .0465 | .00775 | .00667 | .00062 | 10.7 |
| 2 | .775 | .00775 | .00760 | .00109 | 7.1 |
| 3 | .00775 | .00775 | .00388 | .00031 | 12.5 |

What is claimed is:

1. A composite film structure containing a plurality of separate layers comprising:
   (a) a first inorganic layer having a thickness not greater than 600 angstroms and having an oxygen transmission rate (OTR) not greater than 0.8 cubic centimeters/square meter-day-atmosphere;
   (b) a second inorganic layer having a thickness not greater than 600 angstroms and having an oxygen transmission rate (OTR) not greater than 0.8 cubic centimeters/square meter-day-atmosphere; and
   (c) a polymeric barrier layer having an oxygen permeability coefficient (OPV) not greater than 1.5 cubic centimeters-25 microns/square meter-day-atmosphere
wherein the polymeric barrier layer (c) is in contact or in substantial contact with at least one of the first (a) and second (b) inorganic layers, wherein the first (a) and second (b) inorganic layers are separated from one another by an intermediate adhesive layer and wherein the oxygen transmission rate (OTR) of the composite film structure is not greater than 0.012 cubic centimeters/square meter-day-atmosphere and the oxygen transmission rate (OTR) and oxygen permeability coefficient (OPV) are measured in accordance with ASTM D3985-81 at a temperature of 23° C., 50% relative humidity and using 100% oxygen on one side of the film at 760 mm Hg (1 atmosphere) and 100% nitrogen on the other side of the film at 760 mm Hg (1 atmosphere).

2. The composite film structure of claim 1 wherein the polymeric barrier layer (c) is in contact with at least one of the first (a) and second (b) inorganic layers.

3. The composite film structure of claim 1 wherein the first (a) and second (b) inorganic layers are metal.

4. The composite film structure of claim 3 wherein the metal is selected from the group consisting of aluminum, nickel, copper, tin and stainless steel.

5. The composite film structure of claim 4 wherein the metal is vacuum deposited aluminum.

6. The composite film structure of claim 1 wherein the polymeric barrier layer comprises polyvinyl alcohol, ethylene vinyl alcohol, polyacrylonitrile, or combinations thereof.

7. The composite film structure of claim 2 wherein the polymeric barrier layer has a thickness of from 0.01 to 75 microns.

8. The composite film structure of claim 7 wherein the polymeric barrier layer has a thickness of from 0.40 to 0.80 micron.

9. The composite film structure of claim 1 which is flexible and can be wound in a roll.

10. The composite film structure of claim 1 wherein the polymeric barrier layer (c) is positioned between the first (a) and second (b) inorganic layers.

11. The composite film structure of claim 10 wherein the polymeric barrier layer (c) contacts or substantially contacts both the first (a) and second (b) inorganic layers.

12. The composite film structure of claim 11 wherein the first (a) and second (b) inorganic layers are metal.

13. The composite film structure of claim 12 wherein the metal is vacuum deposited aluminum.

14. The composite film structure of claim 1 wherein each of the first (a) and second (b) inorganic layers has a thickness of not greater than 350 angstroms.

15. The composite film structure of claim 14 wherein each of the first (a) and second (b) inorganic layers has a thickness of not greater than 230 angstroms.

16. The composite film structure of claim 1 wherein the first (a) and second (b) layers are silicon dioxide or aluminum oxide.

17. The composite film structure of claim 11 wherein the first (a) and second (b) inorganic layers are silicon dioxide or aluminum oxide.

* * * * *